UNITED STATES PATENT OFFICE.

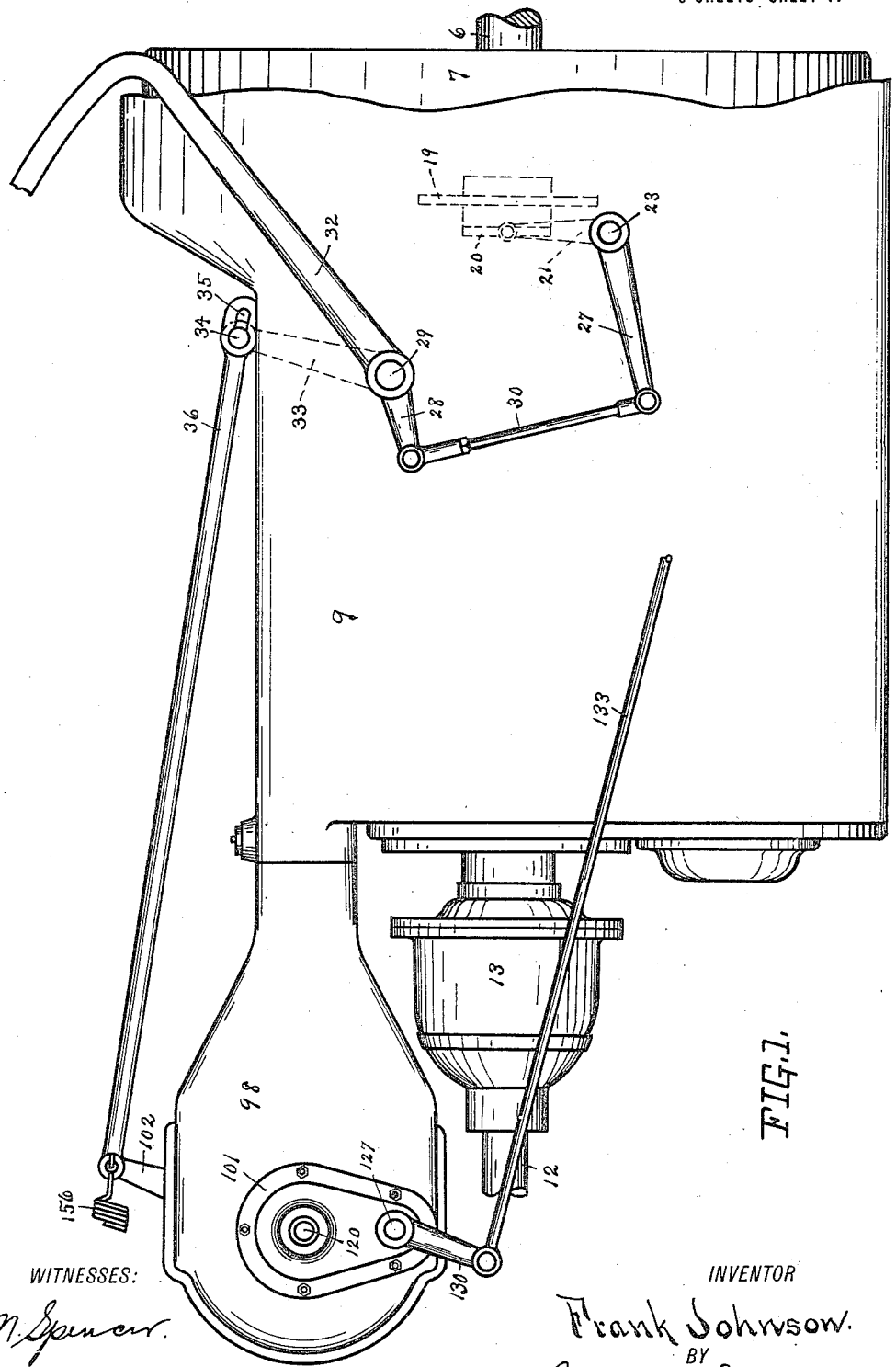

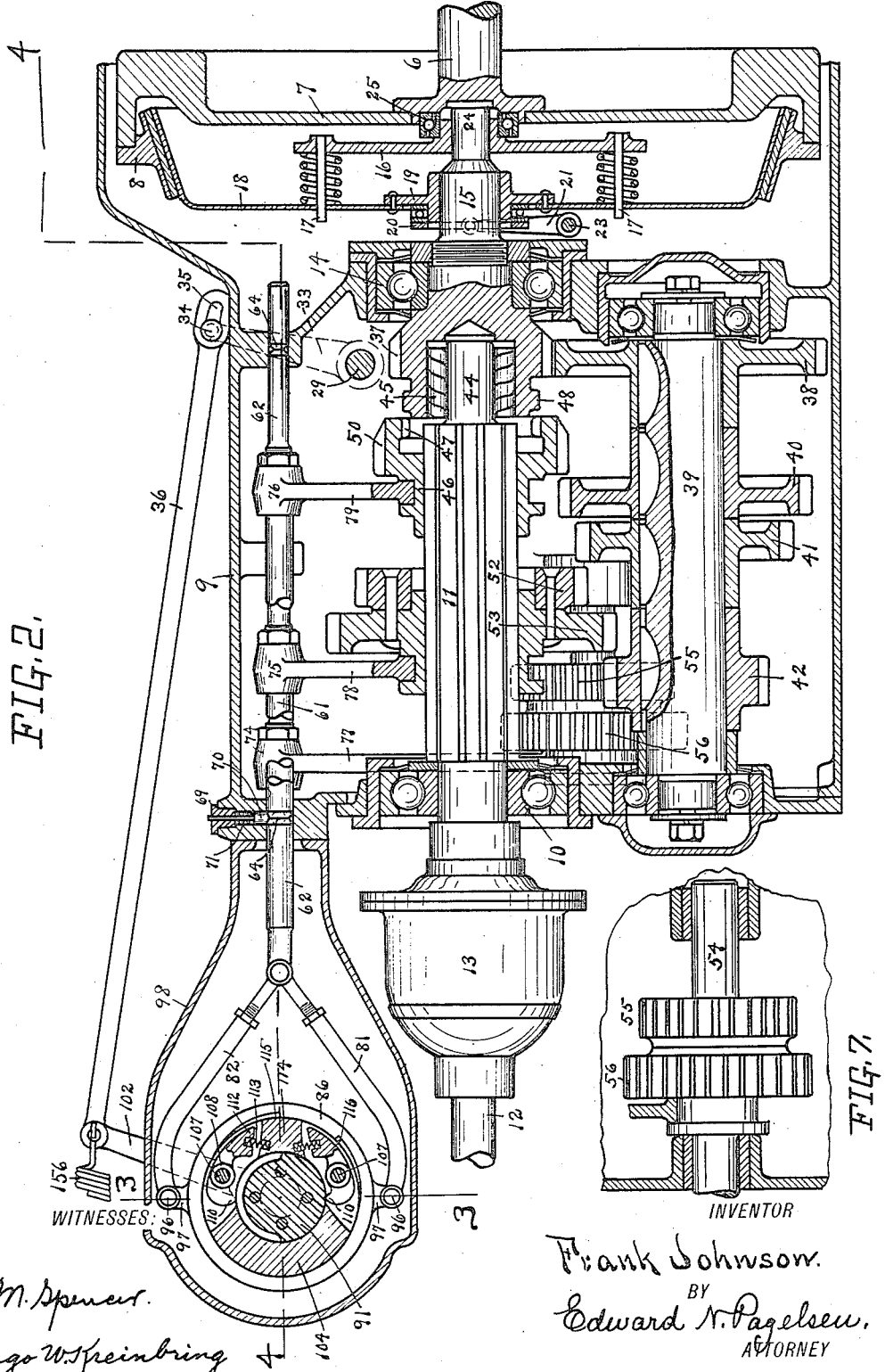

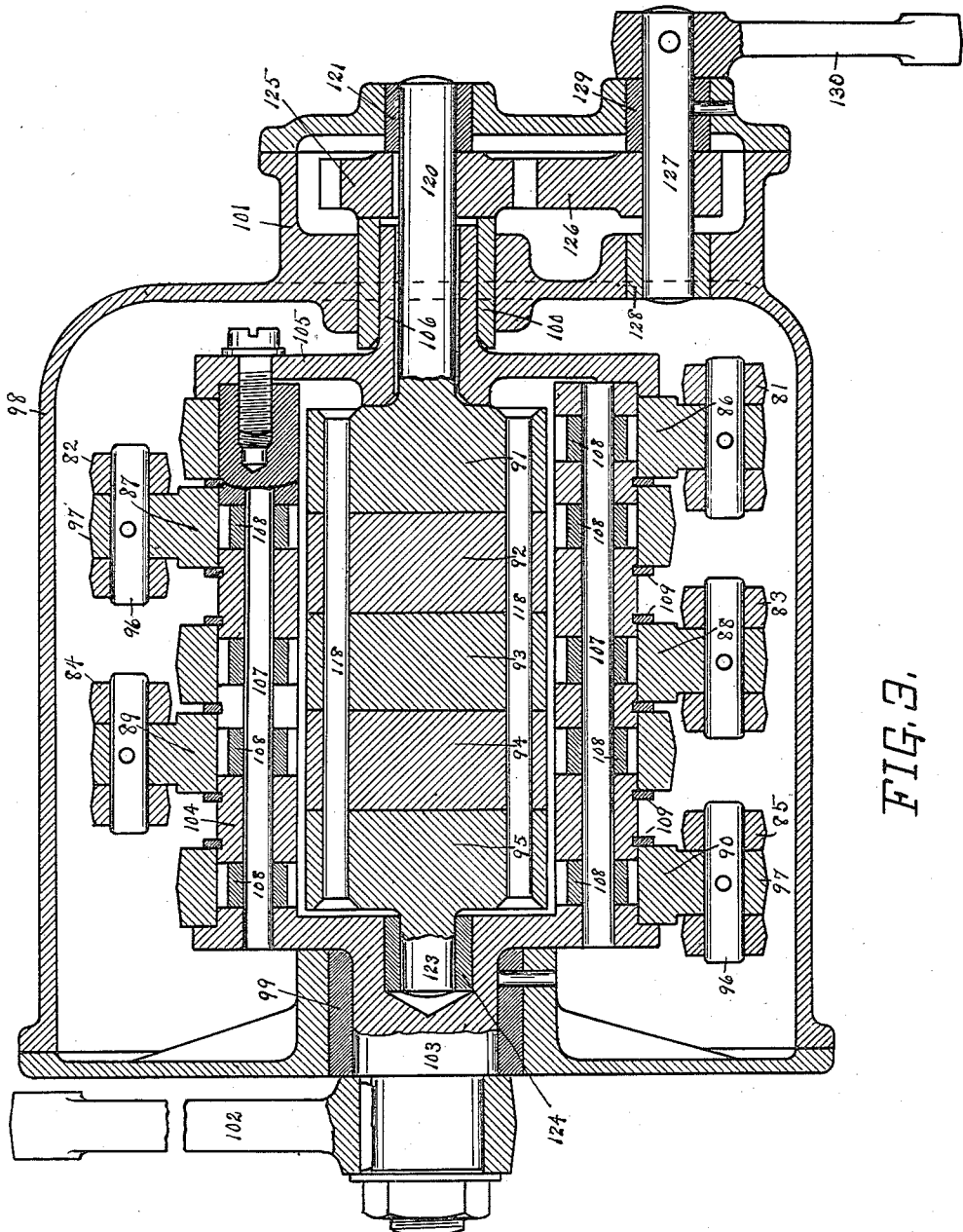

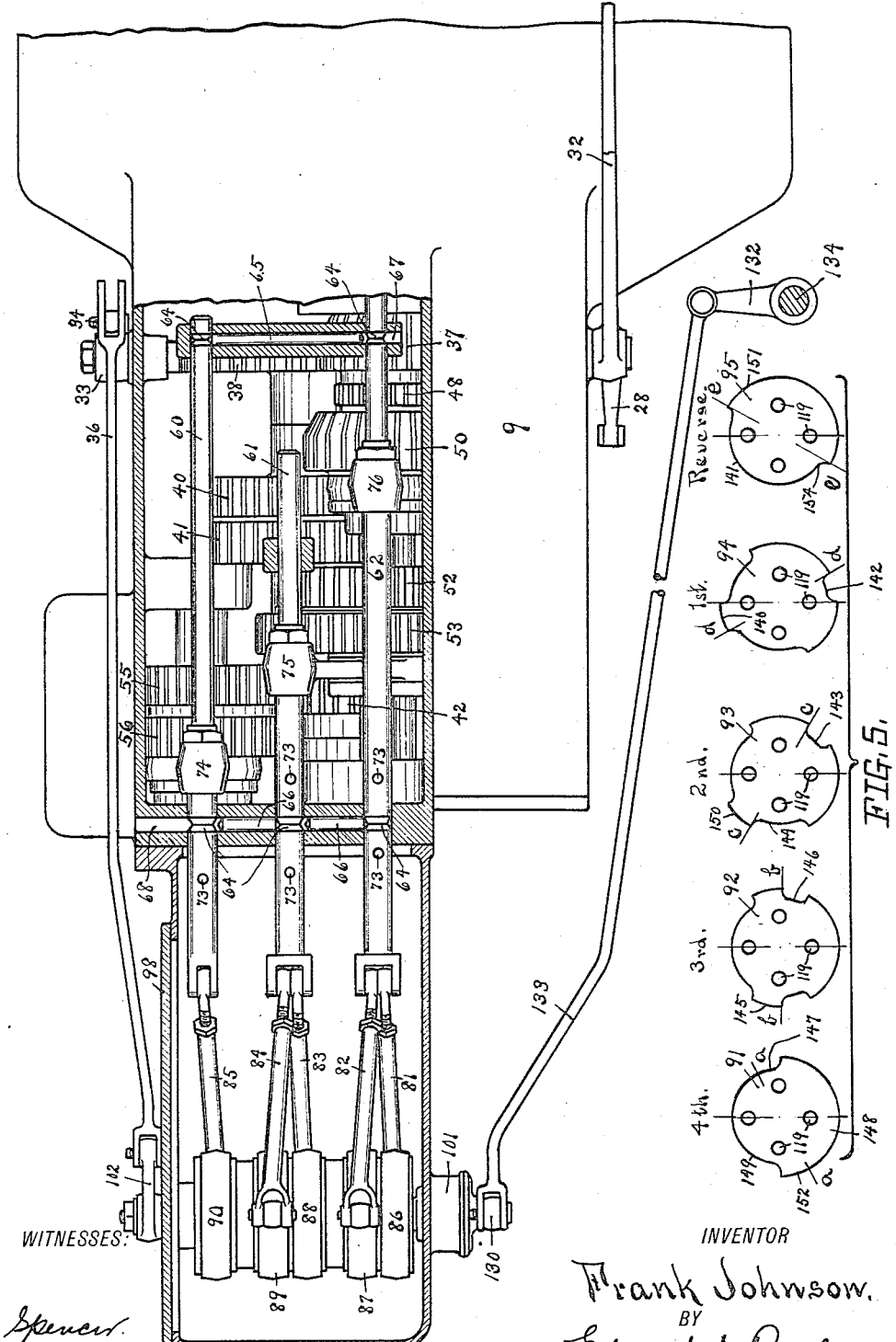

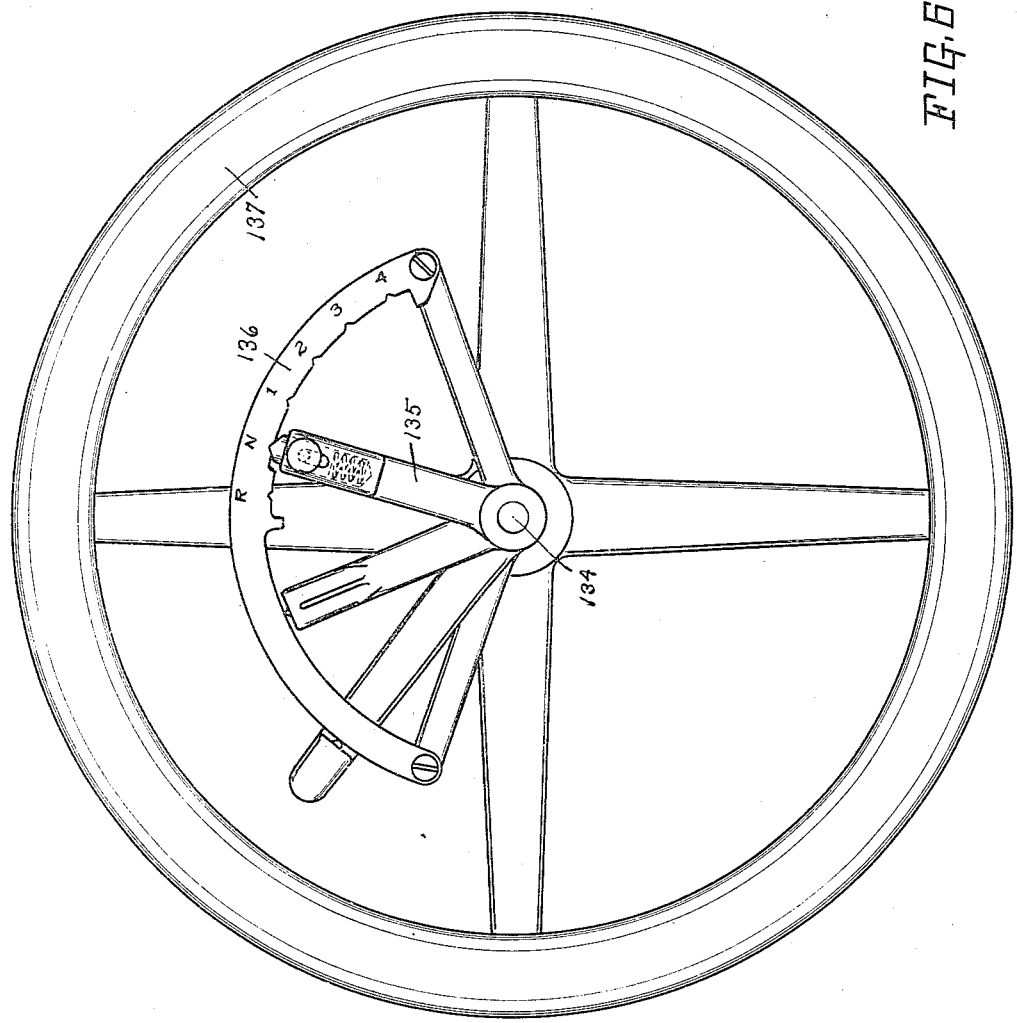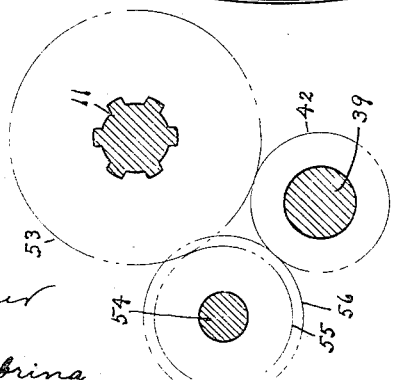

FRANK JOHNSON, OF DETROIT, MICHIGAN, ASSIGNOR TO CADILLAC MOTOR CAR COMPANY, OF DETROIT, MICHIGAN, A CORPORATION OF MICHIGAN.

SPEED-CHANGING MECHANISM.

1,265,668. Specification of Letters Patent. Patented May 7, 1918.

Application filed September 22, 1913. Serial No. 790,997.

*To all whom it may concern:*

Be it known that I, FRANK JOHNSON, a citizen of the United States, and a resident of Detroit, in the county of Wayne and State of Michigan, have invented a new and Improved Speed-Changing Mechanism, of which the following is a specification.

This invention relates to means for changing the relative speeds of the crank shafts and of the propeller shafts of power-driven vehicles, and its object is to provide a simple and effective transmission mechanism which shall be controlled by a selecting device so constructed that it may be positioned at any time prior to the changing of the transmission gears.

This invention consists in combination with an indicator and a plurality of movable selector cams connected thereto, of a transmission gear shifting device comprising an operating member and a series of controllers adapted to engage the selectors, and gear shifters operated by said actuating member whenever their respective controllers are properly positioned by the selector.

In the accompanying drawings Figure 1 is a side elevation of the transmission case and of the case for the controlling mechanism. Fig. 2 is a vertical section thereof parallel to the plane of Fig. 1. Fig. 3 is a vertical section on the line 3—3 of Fig. 2 on a larger scale. Fig. 4 is a horizontal section on the line 4—4 of Fig. 2. Fig. 5 is a diagrammatic view of the selector cams. Fig. 6 is a plan of a steering wheel of an automobile showing the indicating and positioning device. Fig. 7 is a detail of the reversing gear and shifter. Fig. 8 is a diagram illustrating the relations of the shafts within the transmission case.

Similar reference characters refer to like parts throughout the several views.

This invention is designed to facilitate the changing or the reversing of the speed of power-driven vehicles, and consists generally of an indicating device comprising a movable member which can be shifted by the driver in conjunction with a scale which has characters indicating the relative speed and direction of movement. Fig. 6 shows how this device may be preferably mounted at the head of the steering post above the steering wheel. The changing of the gears, and thereby of the speed or direction of the vehicle, is preferably effectuated by the clutch pedal of the vehicle, which pedal during the first portion of its forward movement disengages the engine from the transmission gears and then, if desired, shifts the gear already in engagement to neutral position. At the beginning of the return movement of the clutch pedal the selected gears, if the speed or direction is to be changed, are shifted into engagement, and during the last portion of the return movement of the clutch pedal, the clutch is permitted to connect the crank shaft to the transmission gears so that the engine will be immediately coupled to the driving axle.

In the accompanying drawings, especially in Figs. 1 and 2, 6 is the crank shaft of the engine to which is connected the drum 7 having a clutch ring 8. A transmission case 9 carries ball bearings 10 for the transmission main shaft 11, which connects to the propeller shaft 12 by means of a universal coupling 13, and the propeller shaft connects to the rear axle of the vehicle in any desired manner.

This case 9 also carries a ball bearing 14 for the transmission stub shaft 15, whose forward end has secured to it a disk 16, which carries the pins 17 that extend through the plate 18, forming the second clutch member. This plate is secured to a hub 19 against which the ring 20 is pressed by means of the usual crank arm 21, mounted on the shaft 23. The front end 24 of this stub shaft is guided to run concentrically with the crank-shaft 6 by means of the ball bearing 25.

On the outer end of the cross-shaft 23 (Fig. 1) is secured a crank-arm 27, which connects to the crank-arm 28 on the shaft 29 by means of a link 30. To this shaft may be secured the clutch-pedal 32 of any desired construction and the crank-arm 33 which carries a pin 34 that extends through a slot 35 in the forward end of the link 36.

The rear end of the stub shaft 15 is enlarged and formed to constitute the gear 37 that meshes with the gear 38 on the countershaft 39. Secured to this countershaft are gears 40, 41 and 42. The front end 44 of the shaft 11 is journaled in roller bearing 45 in the rear end of this stub shaft 15. On the shaft 11 is slidably splined the clutch member 46 having internal teeth 47 that are designed to engage the complementary teeth 48 on the rear end of the stub shaft 15. It will be noticed that when this clutch member 46 is moved to the right in Fig. 2, which is toward the front of the vehicle, that the stub shaft 15 and the shafts 11 and 12 will all be in direct engagement and revoluble at the same speed. But if this clutch member 46 is slid back until its gear teeth 50 engage with the gear 40 on the countershaft 39, then the gear 37 on the intermediate shaft 15, which is in constant engagement with the gear 38 on the countershaft, will drive this shaft 11 through the countershaft, the gear 40 and the gear 50 at a somewhat slower speed than the speed of the crank-shaft. These two speeds are known as the fourth and third speeds respectively.

Slidably splined on the shaft 11 are two connected gears 52 and 53, adapted respectively to mesh with the gears 41 and 42 on the counter shaft. When these gears 52 and 53 are shifted to the right until the gear 52 engages the gear 41, the clutch 46 being in the position shown in Fig. 2, then the intermediate shaft 15 will drive the shaft 11 through the gears 37, 38, 41 and 52; but when the gear 53 is in engagement with the gear 42, then the countershaft will drive the shaft 11 at its slowest speed. These two are known as the second and first speeds of this transmission, respectively.

Loosely slidable and revoluble on the reversing gear shaft 54, mounted in the case as shown in Figs. 7 and 8, are the connected reversing gears 55 and 56. These gears are shifted to the right, in Fig. 2, toward the engine in the ordinary vehicle, until the gear 55 meshes with the gear 53 and the gear 56 meshes with the gear 42. The other gears remain in the positions shown in Fig. 2. This engagement of the gears 42—56—55—53 will cause the shaft 11 to turn in the opposite direction from the shaft 15. The relative locations of the shafts 11, 39 and 54 are indicated in Fig. 8. The details of the transmission thus far described form no part of the present invention, and any other proper transmission may be substituted therefor.

The gears of this transmission may be shifted by means of the rods 60, 61 and 62, for respectively the reverse, the 1st and 2nd, and the 3rd and 4th speeds. It will be noted that only one of these rods should be shifted at any time from its neutral position, shown in Fig. 4, and for this reason, they are provided with grooves 64, into which the ends of the interlocking bolts 65 and 66 enter when the next adjacent rod is shifted. These rods are slidable in transverse holes 67 and 68 in the case 9.

Vertical holes in the case above these rods contain the guides 69, pins 70 and springs 71, as shown in Fig. 2. The pointed lower ends of these pins enter the grooves 64 and holes 73 in these rods to hold them in any desired position. Collars 74, 75 and 76 on these rods carry the forks 77, 78 and 79, respectively, whereby the gears are connected to the rods.

These rods 62, 61 and 60 connect to links 81, 82, 83, 84 and 85, which connect to the collars 86, 87, 88, 89 and 90, respectively, of the selector cams 91, 92, 93, 94 and 95, respectively, of the 4th, 3rd, 2nd, 1st and reverse speeds, respectively, by means of pins 96 that pass through the lugs 97 on these collars.

Connected to the case 9 of the transmission is the case 98 of the selecting mechanism, which carries the bearings 99 and 100 of the gear shifting mechanism. Attached to this case 98 is a small case 101 for a connecting gear.

The connecting rod 36 attaches to an arm 102 (Fig. 3) on the end of the hub 103 of the gear shifting drum 104, to which is secured a head 105 having a hub 106, journaled in the bearing 100. Rods 107 extend through holes in this drum and act as pivots for the dogs 108 mounted in pockets cut in the drum in the transverse planes of the collars 86 to 90 inclusive. These collars may be held in position by spring-rings 109. These dogs 108 are provided with inwardly turned noses 110 and tails 112 (Fig. 2) while compression springs 113 are mounted between the tails of the dogs and the part 114 of the drum. The collars 86 to 90 inclusive are provided with notches 115 and 116, the shoulders of which are shown to be about sixty degrees apart.

The selector is composed of a series of cams 91 to 95 inclusive, secured together by means of bolts 118 which pass through the holes 119. The cam 91 has a stem 120 extending through the hub 106 of the drum 104, and journaled in the bearing 121 carried by the case 101. The cam 95 has a trunnion 123 journaled in a bearing sleeve 124 in the hub 103 of the drum 104. On the stem 120 is secured a gear 125 that meshes with the segment 126 connected to the shaft 127 mounted in the bearing sleeves 128 and 129, carried by the case 101.

Mounted on the shaft 127 is a crank arm 130 which connects to the crank arm 132 by means of the link 133. This crank arm 132 is mounted and turned in any desired manner, but is preferably connected to the lower end of a shaft 134 mounted in the steering post, and an indicator 135 is preferably secured to the upper end of this shaft. A notched segment 136 may be secured to the steering post above the wheel 137 and be provided with notches opposite the characters R, N, 1, 2, 3 and 4, which denote Reverse, Neutral, 1st speed, 2nd speed, 3rd speed and 4th speed, respectively. The selector cams may therefore be properly positioned, according to the position of the indicator 135.

The angular movement of the indicator will be multiplied by the gear 125 and segment 126, and, while any desired movement of the indicator and selector may be provided for, the mechanism shown is so constructed that a movement of the indicator from N to R will turn the selector thirty degrees to the left. By swinging the indicator to the notches marked 1, 2, 3 or 4, the selector will be turned thirty, sixty, ninety, or one hundred and twenty degrees, respectively. The different views show the selector at neutral position.

Referring now to Fig. 2, it will be remembered that the drum 104 is turned by the arm 102 and carries the dogs 108 with it. The distance is about thirty degrees, first to the right and then to the left. All the selector units are shown in Fig. 5 in neutral position, and it will be seen that at the beginning of their movements, each of the teeth 110 of the upper dogs will drop, if it has not already dropped, the tail of each dog being swung out by its spring 113. If the "3rd speed" gears are in engagement, the rod 62 will be at the left end of its movement and the collar 87 will be turned to the left nearly thirty degrees and the collar 86 the same distance to the right. At the movement of the crank arm 102 to the right, the upper dog 108 will immediately engage in the notch 115 of the collar 87 and turn it to the right, to the position shown in Fig. 2. This movement of the collar 87 will result in the collar 86 being turned an equal distance to the left, because of the connection of the two collars to the rod 62 by means of the links 81 and 82.

In a similar manner, should the rod 62 and the gear-clutch 46 be in their "4th speed" position, that is, at the right end of their movement, the collar 86 will have been turned to the left, and will be turned back to the right by means of its upper dog 108 and by the drum 104 to shift the gear-clutch to neutral. The same action occurs when the 1st and 2nd speed gears are to be shifted to neutral position. When the reverse gears are in mesh, the rod 60 is at the right end of its movement and the collar 90 is turned to the left. Therefore, when the selector is at neutral position, the upper dog will turn its collar to the right and slide the reverse gears to the position shown in Fig. 2.

It will be evident that if the transmission gears are set for any speed and it is desired to change to another, that the gears in mesh must be shifted to neutral. To effect this, the various cams shown in Fig. 5 are provided with high and low portions. In considering this mechanism it may be remembered that the cams shown in Fig. 5 turn in the same direction to and from neutral as the indicator 135 in Fig. 6.

If now the reverse gear is in mesh and it is desired to change to the 1st speed, the indicator is swung to the notch "1." This will turn the selector cams thirty degrees to the right from the positions shown in Fig. 5, and turn the cam 94 until the line $d$—$d$ is vertical. The cam 95 will also be turned thirty degrees to the right. At the forward movement of the arm 102 and the turning of the drum 104 to the right, the nose of the upper dog of the cam 94 will ride on the high part 140 of this cam and the dog will have no effect on the collar 89, but the nose of the upper dog of the reverse cam 95 will ride on the low portion 141 of the cam and its tail will engage the notch 115 of the collar 90 and turn this collar to the right and so shift the reverse gears 55 and 56 to the left, that is, to neutral. At the end of this movement, the tail of the lower dog of the cam 94 will reach the notch 116 of the collar 89, and as the nose of this dog is nearly against the low portion 142 of the cam 94, the collar 89 will be turned to the left, forcing the rod 61 to the left and the gear 53 into mesh with the gear 42 on the countershaft.

The cam 93, which coördinates with the collar 88, is so formed that its lower dog is held out of engagement with its notch 116 during the time the rod 61 is being shifted by the arm 102. When the cam 93 is turned until its line $c$—$c$ is vertical, then the noses of the upper dogs of all the units except 93 engage low portions of their respective cams and thus shift the rods 60, 61 or 62 to neutral if not already there. At the return of the arm 102 the nose of the lower dog rides on the low portion 143 of the cam 93, and its tail will engage the notch 116 of the collar 88, turning the collar to the left and forcing the rod 61 to the right by means of the link 83, thus obtaining second speed.

When the third speed is desired, the selector is turned until the line $b$—$b$ is vertical in Fig. 5. This brings the low portion 144 of the cam 93 under the nose of its upper dog, and as the collar 88 had been left turned to the right, when the arm 102 is swung, the tail of this dog will engage the notch 115 and the collar will be turned to neutral position. In this case as in all others, the upper dog returns the collar to neutral position. The lower dog always does the positioning. As the 3rd speed is desired, the upper dog of cam 92 will ride inoperatively on the high portion 145 of this cam, so that, if the 3rd speed were already in use, it would not be brought back to neutral. But on the return stroke, the nose of the lower dog will ride on the low portion 146 of this cam and the tail of the dog will engage in the notch 116 of the collar 87 and turning this collar to the left, pull the rod 62 to the left, thus obtaining third speed.

In a similar manner the nose of the lower dog of cam 91 will ride in the low portion 147 and therefore engage the notch 116 of the collar 86, forcing the rod 62 to the right.

It will now be observed that all the upper dogs should be operative during the forward or neutralizing movement of the actuating mechanism except that of the cam selected. This means that each cam has a low portion extending sixty degrees to the right of the vertical line when the cams are in neutral position, and one hundred twenty degrees to the left of said line, excepting that each cam has its own high portion, thirty degrees in length, projecting up from this low portion, on which the nose of its upper dog rides during the time the cam is operative, so as to prevent the dog shifting its own gears back to neutral. These high portions are that portion 152 of the part 148 of the cam 91 between the line a—a and the low portion 149 of this cam, the part 145 of the cam 92, the part 150 of the cam 93, the part 140 of the cam 94, and the thirty degrees of the part 151 of the cam 95 at the upper right hand next the line e—e.

Similarly, the nose of the lower dog of each cam must be held out on all cams but the one selected by high portions of the cams in order to prevent the tails of the dogs engaging the notches 116 of their respective collars, and a low portion thirty degrees in length must be provided in each cam to permit such engagement. As the low portions of the cams occupy one hundred eighty degrees, with the exception of thirty degrees of high portions, so the high portions occupy the same distances with the exception of thirty degrees of low portions which occur just to the left of the lower ends of the lines a—a, b—b, c—c, d—d and e—e, when these lines are vertical, and are opposite the short high portions just described, which low portions are marked 147 in cam 91; 146 in cam 92; 148 in cam 93; 142 in cam 94; and 154 in cam 95.

This arrangement of the high and low portions of the cams insures the shifting of all gears to neutral unless the proper gears are in proper position for the speed selected. It further insures the movement to proper position of those gears alone which will give the proper speed. And this shifting to neutral occurs only when the actuating mechanism is given its first movement and the positioning of the selected gears occurs only at the return movement of the actuating mechanism.

So long as the vehicle is running at the speed specified by the indicator, any back and forth movement of the clutch-pedal is without effect on the transmission gears, for the upper dog of the selector for that speed is held out of operation. But if the indicator is shifted to any other position, the transmission gears just previously employed will be shifted to neutral at the next forward movement of the clutch-pedal.

The shifting of the selected gears to operative position is preferably accomplished by means of a spring 156 connecting to the link 36 and any fixed support. This spring will normally shift the gears in advance of any thrust from the crank arm 33. But in case the shifting gears should be so positioned that their teeth abut end to end with the coöperative gears, the jamming action of the arm 33 will assist the spring 156 to cause the ends of the teeth to engage, after which the spring 156 will continue to slide the shifted gears along to full engagement. The proportions and adjustments of the parts are such that the main clutch of the engine will not begin to engage until the shifted gears have about one-half the lengths of their teeth in engagement with the teeth of the coöperative gears.

The details and proportions of this mechanism may all be changed by skilled automobile engineers without departing from the spirit of my invention.

I claim.

1. In a speed changing mechanism, the combination of an indicator, a selector connected thereto and comprising a series of cams, an actuator, and a series of operating devices each embodying an element positioned by said selector for shifting proper gears to the positions specified by the indicator.

2. In a speed changing mechanism, the combination of a plurality of gear shifting rods, each adapted to be shifted longitudinally in both directions from neutral position, operating devices for shifting said rods, each embodying a revoluble collar and a connecting rod, a revoluble actuator, a series of pairs of dogs carried thereby, one pair for each operating device, one dog of each pair adapted to move a shifting rod to neutral position and the other dog to move said rod and the gears connected thereto to operative position, and a selecting mechanism for said dogs.

3. In a speed changing mechanism, the combination of a plurality of gear shifting rods, each adapted to be shifted longitudinally in both directions from neutral position, operating devices for shifting said rods, each embodying a revoluble collar and a connecting rod, a revoluble actuator, a series of pairs of dogs carried thereby, one pair for each operating device, one dog of each pair adapted to move a shifting rod to neutral position and the other dog to move said rod and the gears connected thereto to operative position, and a cam to properly position each pair of dogs.

4. In a speed changing mechanism, the combination of a plurality of gear shifting rods, each adapted to be shifted longitudinally in both directions from neutral position, operating devices for shifting said rods, each embodying a revoluble collar and a connecting rod, a revoluble actuator, a series of pairs of dogs carried thereby, one pair for each operating device, one dog of each pair adapted to move a shifting rod to neutral position and the other dog to move said rod and the gears connected thereto to operative position, a selecting mechanism for said dogs, and an indicator for positioning the selecting mechanism.

5. In a speed changing mechanism, the combination of a plurality of gear shifting rods, each adapted to be shifted longitudinally in both directions from neutral position, operating devices for shifting said rods, each embodying a revoluble collar and a connecting rod, a revoluble actuator, a series of pairs of dogs carried thereby, one pair for each operating device, one dog of each pair adapted to move a shifting rod to neutral position and the other dog to move said rod and the gears connected thereto to operative position, a selecting mechanism for said dogs, an indicator for positioning the selecting mechanism, and a graduated bar adjacent said indicator.

6. In a speed changing mechanism, the combination with a plurality of rods for shifting the transmission gears of a vehicle, links for shifting each of said rods and the gears connected thereto to and from neutral position, collars to which said links are connected, a revoluble actuator, dogs carried thereby, and a selector for positioning said dogs and thereby determining the collar to be revolved and its direction of revolution.

7. In a speed changing mechanism, the combination with a plurality of rods for shifting the transmission gears of a vehicle, links for shifting each of said rods and the gears connected thereto to and from neutral position, collars to which said links are connected, a revoluble actuator, dogs carried thereby, and a selector for positioning said dogs comprising a series of connected cams, one for each link, which cams determine the collar to be revolved and its direction of revolution.

8. In a speed changing mechanism, the combination with a plurality of rods for shifting the transmission gears of a vehicle, links for shifting each of said rods and the gears connected thereto to and from neutral position, collars to which said links are connected, a revoluble actuator, dogs carried thereby, a selector for positioning said dogs and thereby determining the collar to be revolved and its direction of revolution, and an indicator for positioning said selector.

9. In a speed changing mechanism, the combination with a plurality of rods for shifting the slidable gears of a vehicle transmission, of a pair of links connected to each of said rods, each link of each pair adapted to shift the rod and gears connected thereto longitudinally into engaging position at one side of neutral, a revoluble collar connected to each link, a drum on which said collars are mounted, engaging members for each collar mounted on the drum, a selector to predetermine the collar and its direction of movement by said drum, and means to oscillate the drum.

10. In a speed changing mechanism, the combination with a plurality of rods for shifting the slidable gears of a vehicle transmission, of a pair of links connected to each of said rods, each link of each pair adapted to shift the rod and gears connected thereto longitudinally into engaging position at one side of neutral, a revoluble collar connected to each link, a drum on which said collars are mounted, engaging members for each collar mounted on the drum, a selector to predetermine the collar and its direction of movement by said drum, means to oscillate the drum, and an indicator connected to the selector to position the same.

11. In a speed changing mechanism, the combination with the gear shifting rods of a vehicle transmission mechanism, interlocking means to prevent the actuation of more than one rod at a time, an operating device, connectors between the operating device and the shifting rods, and a selector to determine the action of the operating devices.

12. In a speed changing mechanism, the combination with a plurality of gear shifting rods of a vehicle transmission mechanism adapted to be moved longitudinally either way from neutral position, an interlock between said rods to prevent more than one rod being moved from neutral position, an operating device comprising a pair of links for each rod and a collar for each link, said links of each pair adapted to move their respective rods in opposite directions from neutral, a drum on which the collars are mounted, a pair of dogs for each collar mounted on the drum, each dog adapted to turn the collar and shift a rod in one direction, and a selector concentric with the collars and drum to control the operation of the dogs.

13. In a speed changing mechanism, the combination with a plurality of gear shifting rods of a vehicle transmission mechanism adapted to be moved longitudinally either way from neutral position, an interlock between said rods to prevent more than one rod being moved from neutral position, an operating device comprising a pair of links for each rod and a collar for each link, said links of each pair adapted to move their respective rods in opposite directions from neutral, a drum on which the collars are mounted, a pair of dogs for each collar mounted on the drum, each dog adapted to turn the collar and shift a rod in one direction, a selector concentric with the collars and drum to control the operation of the dogs, and means for positioning said selector.

14. In a speed changing mechanism, the combination with a plurality of gear shifting rods of a vehicle transmission adapted to be moved longitudinally either way from neutral position, an interlock between said rods to prevent more than one rod being moved from neutral position, an operating device comprising a pair of links for each rod and a collar for each link, said links of each pair adapted to move their respective rods in opposite directions from neutral, a drum on which the collars are mounted, a pair of dogs for each collar mounted on the drum, each dog adapted to turn the collar and shift a rod in one direction, a series of cams, one for each collar, mounted concentric with the drum to control the operation of the dogs, and an indicator to position the cams.

15. In a speed changing device, the combination of an indicator, a plurality of selector cams connected thereto, and a transmission-gear shifting device comprising an operating member, a series of controllers adapted to engage the selectors, and gear engaging members actuated by said operating member whenever the proper controllers have been properly positioned by the selector.

16. In a speed changing device, the combination of a case, transmission gears therein, rods for shifting said gears slidably in the case and provided with circumferential grooves which are in line when the rods are in neutral position, interlocking bars slidable in the case transversely to the rods and having pointed ends adapted to enter said grooves and to prevent the movement of more than one rod from neutral position at one time, a revoluble actuator, a series of collars mounted thereon, one for each direction in which each rod is movable from neutral position, connectors mounted on the actuator and adapted to engage said collars, and a selecting device to position said connectors.

17. In a speed changing mechanism, the combination with the rods for shifting the transmission gears of a vehicle, links for shifting said rods, one for each direction in which each rod is movable from neutral position, a hollow operating drum having a series of pairs of transverse slots, longitudinal pivot rods extending across the slots, dogs mounted in said slots on said pivot rods and constituting pairs, a collar mounted on the drum in the plane of each pair of dogs and formed to be engaged by the dogs, links connecting the collars to the gear shifting rods, and a selector for determining the dogs to be moved to operative position, the rod to be shifted, and the direction of its movement.

18. In a speed changing mechanism, the combination with the rods for shifting the transmission gears of a vehicle, links for shifting said rods, one for each direction in which each rod is movable from neutral position, a hollow operating drum having a series of pairs of transverse slots, longitudinal pivot rods extending across the slots, dogs mounted in said slots on said pivot rods and constituting pairs, a collar mounted on the drum in the plane of each pair of dogs and formed to be engaged by the dogs, links connecting the collars to the gear shifting rods, a rotatable selector mounted within the drum and engaged by the dogs to predetermine the positioning of the dogs, the gear shifting rod to be moved and the direction of its movement.

19. In a speed changing mechanism, the combination with the rods for shifting the transmission gears of a vehicle, links for shifting said rods, one for each direction in which each rod is movable from neutral position, a hollow operating drum having a series of pairs of transverse slots, longitudinal pivot rods extending across the slots, dogs mounted in said slots on said pivot rods and constituting pairs, a collar mounted on the drum in the plane of each pair of dogs and formed to be engaged by the dogs, links connecting the collars to the gear shifting rods, a rotatable selector mounted within the drum and engaged by the dogs and consisting of a series of cams united side by side, said cams having high and low portions of the same length, to predetermine the positioning of the dogs, collars and gear shifting rods.

20. In a gear changing device, the combination of a plurality of gear shifting rods, each adapted to be shifted longitudinally in both directions from neutral position, operating devices for shifting said rods, each embodying a revoluble collar and a connecting rod, a revoluble hollow drum, a series of pairs of dogs carried thereby, one pair for each operating device, one dog of each pair adapted to move a shifting rod to neutral position and the other dog to move said rod and the gears connected thereto to operative position, and a rotary selector mounted within said drum.

21. In a gear changing device, the combination of a plurality of gear shifting rods, each adapted to be shifted longitudinally in both directions from neutral position, operating devices for shifting said rods, each embodying a revoluble collar and a connecting rod, a revoluble hollow drum, a series of pairs of dogs carried thereby, one pair for each operating device, one dog of each pair adapted to move a shifting rod to neutral position and the other dog to move said rod and the gears connected thereto to operative position, and a rotary selector mounted within said drum comprising a series of cams, one for each collar, and for each pair of dogs to be positioned thereby.

22. In a gear changing device, the combination of a plurality of gear shifting rods, each adapted to be shifted longitudinally in both directions from neutral position, operating devices for shifting said rods, each embodying a revoluble collar and a connecting rod, a revoluble hollow drum, a series of pairs of dogs carried thereby, one pair for each operating device, one dog of each pair adapted to move a shifting rod to neutral position and the other dog to move said rod and the gears connected thereto to operative position, a rotary selector mounted within said drum, a rotary selector mounted within the drum and comprising a cam for each collar, said cams engaged by said dogs which are positioned by the selector, and an indicator for positioning the selector.

23. In a gear changing device, the combination of a plurality of gear shifting rods, each adapted to be shifted longitudinally in both directions from neutral position, operating devices for shifting said rods, each embodying a revoluble collar and a connecting rod, a revoluble hollow drum, a series of pairs of dogs carried thereby, one pair for each operating device, one dog of each pair adapted to move a shifting rod to neutral position and the other dog to move said rod and the gears connected thereto to operative position, a rotary selector mounted within said drum in engagement with said dogs to position the same, a movable indicator, means connecting the indicator and selector, and a graduated scale provided with retaining devices whereby the proper position of the indicator may be fixed for any desired speed of the gears.

In testimony whereof I have signed this specification in the presence of two subscribing witnesses.

FRANK JOHNSON.

Witnesses:
 HUGO W. KREINBRING,
 L. M. SPENCER.